United States Patent
Todorovic

(10) Patent No.: US 8,220,586 B2
(45) Date of Patent: Jul. 17, 2012

(54) NOISE-REDUCED AIRCRAFT ENGINE AND METHOD FOR REDUCING NOISE EMISSIONS OF AN AIRCRAFT ENGINE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 119 days.

(21) Appl. No.: 12/818,389

(22) Filed: Jun. 18, 2010

(65) Prior Publication Data

US 2011/0005858 A1    Jan. 13, 2011

(30) Foreign Application Priority Data

Jul. 13, 2009 (DE) .......................... 10 2009 032 841

(51) Int. Cl.
| | |
|---|---|
| F02K 1/34 | (2006.01) |
| F02K 1/46 | (2006.01) |
| F01N 1/14 | (2006.01) |
| F02K 1/28 | (2006.01) |
| F02K 1/44 | (2006.01) |
| F01N 1/00 | (2006.01) |

(52) U.S. Cl. .................... 181/213; 181/220; 415/119
(58) Field of Classification Search ............ 181/213, 181/214, 220, 259; 244/1 N, 53 B, 134 B; 415/119
See application file for complete search history.

(56) References Cited

U.S. PATENT DOCUMENTS

| | | | | |
|---|---|---|---|---|
| 3,261,576 | A | * | 7/1966 | Valyi .............................. 244/130 |
| 3,527,317 | A | * | 9/1970 | Motsinger ...................... 181/206 |
| 3,726,091 | A | * | 4/1973 | Tontini ............................ 60/264 |
| 3,815,356 | A | * | 6/1974 | Burge et al. ..................... 60/204 |
| 4,291,782 | A | * | 9/1981 | Klees ............................. 181/215 |
| 4,398,667 | A | * | 8/1983 | Maestrello ............... 239/265.17 |
| 4,692,091 | A | * | 9/1987 | Ritenour ....................... 415/119 |
| 5,222,698 | A | * | 6/1993 | Nelson et al. ................. 244/203 |
| 5,308,225 | A | * | 5/1994 | Koff et al. ..................... 415/57.3 |
| 5,402,963 | A | * | 4/1995 | Carey et al. ................... 244/1 N |
| 5,428,954 | A | * | 7/1995 | Cowan, Sr. ..................... 60/262 |
| 5,662,136 | A | * | 9/1997 | Drzewiecki et al. ............ 137/14 |
| 5,707,206 | A | * | 1/1998 | Goto et al. ................. 415/173.1 |
| 5,721,402 | A | * | 2/1998 | Parente .......................... 181/214 |
| 6,244,817 | B1 | * | 6/2001 | Ngo .............................. 415/119 |
| 6,308,898 | B1 | * | 10/2001 | Dorris et al. ............ 239/265.17 |
| 6,379,110 | B1 | * | 4/2002 | McCormick et al. ......... 415/119 |
| 6,571,549 | B1 | * | 6/2003 | Stanek ............................ 60/262 |
| 6,786,038 | B2 | * | 9/2004 | Lair .............................. 60/226.1 |
| 6,962,044 | B1 | * | 11/2005 | Miller et al. .................... 60/230 |
| 7,097,414 | B2 | * | 8/2006 | Stangeland .................. 415/58.4 |
| 7,581,692 | B2 | * | 9/2009 | Graziosi et al. ............... 244/1 N |
| 8,001,762 | B2 | * | 8/2011 | Efremkin et al. .............. 60/39.5 |
| 8,015,819 | B2 | * | 9/2011 | Thomas et al. ................. 60/770 |

* cited by examiner

*Primary Examiner* — Edgardo San Martin
(74) *Attorney, Agent, or Firm* — Timothy J. Klima; Shuttleworth & Ingersoll, PLC

(57) ABSTRACT

A method for reducing noise emissions of an aircraft engine (3) having a gas turbine (7), includes providing a hot gas layer underneath at least one noise-emitting area of the aircraft engine.

11 Claims, 3 Drawing Sheets

Figure 1:
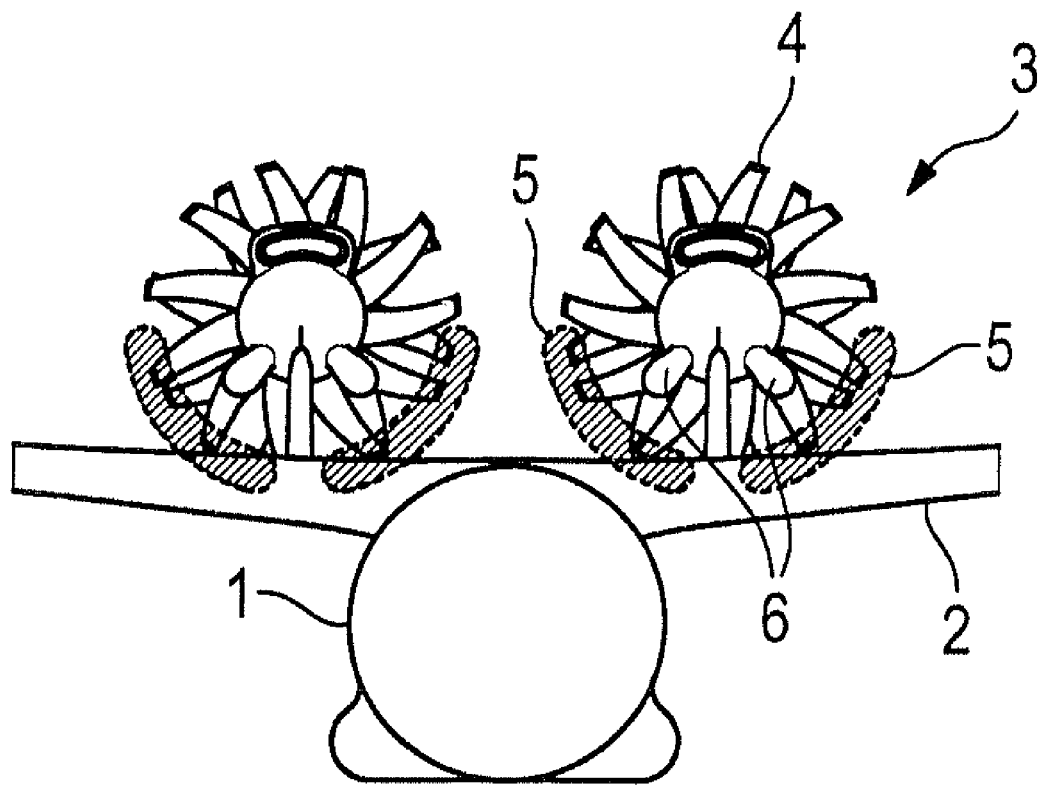

NOISE-REDUCED AIRCRAFT ENGINE AND METHOD FOR REDUCING NOISE EMISSIONS OF AN AIRCRAFT ENGINE

This application claims priority to German Patent Application DE102009032841.6 filed Jul. 13, 2009, the entirety of which is incorporated by reference herein.

This invention relates to a noise-reduced aircraft engine and a method for reducing the noise emissions of an aircraft engine.

The generation of noise of aircraft engines is an important issue, in particular, from an environmental viewpoint. From the state of the art, various approaches are known to reduce the emission of noise. It is produced either by the aircraft engines themselves or by the propeller fans or other components.

The state of the art always refers to firm barriers provided against sound waves to dampen, absorb or reflect noise emissions (noise) and thereby reduce the energy of the sound waves to an acceptable level. Instanced here can be turbofan engines, as well as shrouded propellers, noise-reduction walls with special surfaces, multi-layer sandwich designs or foamed and/or structured surfaces.

All measures known from the state of the art require additional components, complex designs and a multitude of parts which, as regards their manufacture and the materials used, are cost-intensive and increase weight. Furthermore, the additional materials might constitute an environmental impairment.

In a broad aspect, the present invention provides an aircraft engine, in particular an aircraft engine having a gas turbine, which, while being simply designed and cost-effectively producible, is characterized by noise-reduced operation, as well as a method for reducing the noise emissions of an aircraft engine.

According to the present invention, it is therefore provided to dispose, underneath the at least one noise-emitting area of the aircraft engine, a gas layer whose temperature is higher than that of the air (gas) flowing through or around the aircraft engine.

By use of the layer, which has a higher temperature or which is hotter than the gas flowing around or through the engine, a shield is formed. Here, at the transition from colder to hotter air, a part of the sound wave is reflected and directed in the upward direction. Since noise disturbance is always incurred in a downward direction (toward the earth's surface), any reflection in the upward direction is entirely harmless. Furthermore, part of the sound waves, or their energy, is refracted upon entering the warmer or hotter layer. The sound waves, therefore, do not linearly cross the boundary layer, but are directionally changed with a specific refractive index. On a flying aircraft, this has the effect that the sound wave strikes the earth's surface at a shallower angle. This, in turn, results in a larger travel path and a longer travel time of the sound wave, thereby reducing the energy of the sound wave itself. The sound waves now impinging on the earth's surface after a longer travel path accordingly are less intense and produce considerably less noise.

According to the present invention, the layer of hotter gas is preferably produced by the exhaust gas flow of the aircraft engine itself. Therefore, no further measures are required. Rather, the exhaust gas, for example of a gas turbine, is suitably issued in layer-like or part-shell-like form to thereby produce the noise-reducing layer. According to the present invention, the already existing exhaust gas, which may be regarded as "waste product", is therefore utilized for noise reduction. In accordance with the present invention, it is therefore merely necessary to appropriately select the direction and disposition of the exhaust gas flow.

Therefore, according to the present invention, the noise-producing sound waves, which are generated on various assemblies or components of an aircraft engine, are specifically influenceable with regard to their direction and intensity.

Suitable selection of the layer thickness as well as appropriate configuration and disposition of the layer enable the invention to be adapted to the most varied aircraft engines and types of aircraft.

The present invention provides a variety of merits. Firstly, noise emissions are reducible in an effective manner. Secondly, no extra components or other measures are required, with the dampening effect according to the present invention rather being obtained from the physical effect occurring upon transition of the sound wave from cooler air to warmer air. Thus, aircraft engines can be provided, which are more cost-effective, lighter and more universally usable than in the state of the art.

The present invention is more fully described in light of the accompanying drawings showing a preferred embodiment. In the drawings, FIG. 1 is a sectional (schematic) view of a part of an aircraft fuselage with engines provided in accordance with the present invention, FIG. 2 is a schematic side view, analogically to the sectional view A-A shown in FIG. 1, and FIG. 3 is an enlarged detail view of the aircraft tail as per FIG. 2.

FIG. 1 shows, in schematic sectional view, a fuselage 1 of an aircraft with schematically represented wings 2. Arranged above the wings are two aircraft engines 3 which, for example, can be of the turboprop or turbojet type, or be provided as open rotor variant, and include, in the example shown, two propellers in tandem configuration with blades 4.

FIG. 1 further shows two half-shell shaped layers 5 of hot air disposed sidewardly and beneath the aircraft engine 3 and produced by exhaust gases issued from at least one exhaust gas outlet 6 each.

Figure 2:
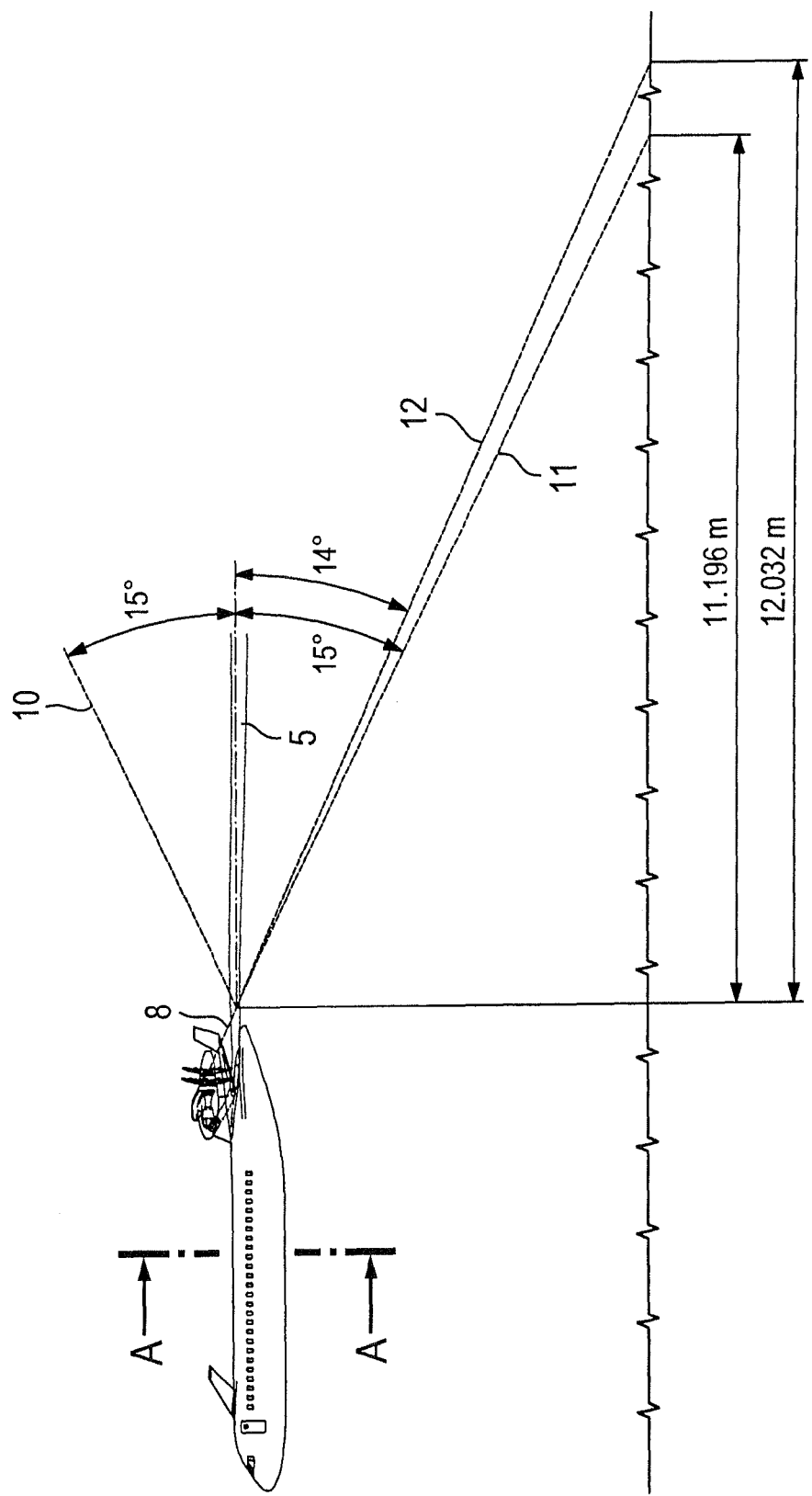
Figure 3:
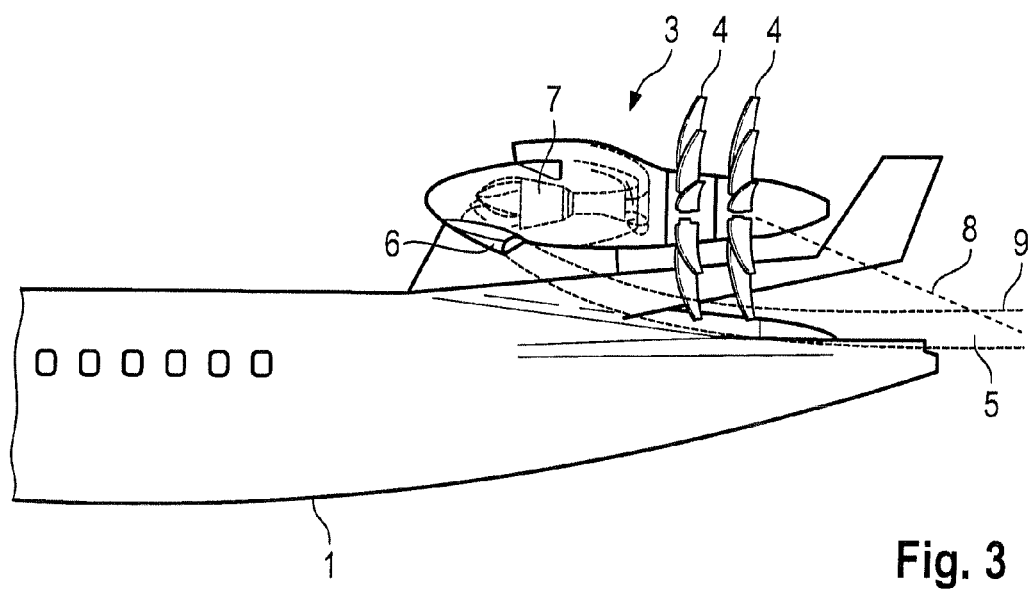

As provided in FIGS. 2 and 3, the exhaust gases of a gas turbine 7 are re-routed to issue, as viewed in the direction of flight, at the front of the aircraft engine 7 via the exhaust gas outlets 6. Thereby, the half-shell shaped layer 5 disposed beneath the aircraft engine 3 is formed as shown in the front view of FIG. 1. Since this layer is exhaust gas, it is considerable hotter than the ambient air flowing around or through the aircraft engine.

The layer 5 is accordingly situated beneath the noise-emitting sound waves. Such a sound wave, which is produced by the blades 4, is schematically shown in FIG. 3 with reference numeral 8.

The sound wave 8 strikes a boundary layer 9 between the ambient air and the hotter layer 5. Resulting therefrom is the noise-dampening effect described in FIG. 2. Part of the sound wave 8 is reflected in the upward direction, with this reflected part of the sound wave being indicated by reference numeral 10 in FIG. 2. Reflection takes place at an angle of 15°, for example.

The non-reflected part of the sound wave 8 is refracted upon crossing the hot layer. The resultant course is indicated with reference numeral 12 in FIG. 2. Refraction leads to a shallower angle of, for example, 14° relative to the center axis of the hot layer 5, while an angle of 15° would apply to a non-refracted sound wave, as indicated by reference numeral 11.

FIG. 2 exemplifies a situation in which the aircraft flies at an altitude of 3,000 m. As shown in this example, the impingement point on the earth's surface of the refracted sound wave will be 12,032 m away from the transition point of the sound wave 8 through the layer 5, while a non-refracted sound wave would reach the earth's surface already after 11,196 m. From this follows the longer travel time of the sound wave and the associated dampening effect.

Therefore, according to the present invention, noise reduction is obtained, on the one hand, by dividing the sound wave 8 into a reflected part 10 and a refracted part 12 and, on the other hand, by the later impingement and the longer travel time of the refracted part 12. Since the sound-wave energy between the sound source and the receiver decreases according to a logarithmic function, a noise reduction is provided according to the present invention which is far superior to that obtainable with a linear function associated with the distance only.

The present invention is not limited to the examples shown. It should rather be noted that a variety of modifications and variations is possible without departing from the inventive concept.

LIST OF REFERENCE NUMERALS

1 Fuselage
2 Wing
3 Aircraft engine
4 Blade
5 Hot layer
6 Exhaust gas outlet
7 Gas turbine
8 Sound wave
9 Boundary layer
10 Reflected part of the sound wave
11 Non-refracted direction of the sound wave
12 Refracted sound wave

What is claimed is:

1. A method for reducing noise emissions of an aircraft engine, comprising:
providing a hot gas source upstream of at least one noise-emitting area of the aircraft engine in relation to a direction of flight of the aircraft engine;
forming hot gas from the hot gas source into a shell-like layer and flowing the shell-like layer externally of the aircraft engine in a downstream direction to extend downstream of and beneath the at least one noise-emitting area of the aircraft engine to create a boundary layer downstream of and beneath the at least one noise-emitting area of the aircraft engine which reflects upward at least a first portion of sound waves emitted from the at least one noise-emitting area of the aircraft engine and refracts at least a second portion of sound waves emitted from the at least one noise-emitting area of the aircraft engine.

2. The method of claim 1, and further comprising using exhaust gas of the aircraft engine for the hot gas layer.

3. The method of claim 2, and further comprising providing the hot gas layer at a higher temperature than air flowing at least one of around and through the aircraft engine.

4. The method of claim 1, and further comprising providing the hot gas layer at a higher temperature than air flowing at least one of around and through the aircraft engine.

5. The method of claim 1, wherein the aircraft engine is a gas turbine.

6. An aircraft engine, comprising:
a mechanism for directing at least a part of an exhaust gas flow from the aircraft engine as a hot gas layer underneath at least one noise-emitting area of the aircraft engine;
the mechanism for directing positioned upstream of the at least one noise-emitting, area of the aircraft engine in relation to a direction of flight of the aircraft engine;
the mechanism for directing constructed and arranged to form the hot gas layer in a shell-like form and flow the shell-like layer externally of the aircraft engine in a downstream direction to extend downstream of and beneath the at least one noise-emitting emitting area of the aircraft engine to create a boundary layer downstream of and beneath the at least one noise-emitting area of the aircraft engine which reflects upward at least a first portion of sound waves emitted from the at least one noise-emitting area of the aircraft engine and refracts at least a second portion of sound waves emitted from the at least one noise-emitting area of the aircraft engine.

7. The aircraft engine of claim 6, wherein a temperature of the hot gas layer is higher than a temperature of air flowing at least one of around and through the aircraft engine.

8. The aircraft engine of claim 7, wherein the engine is of a turboprop type.

9. The aircraft engine of claim 7, wherein the engine is of a turbojet type.

10. The aircraft engine of claim 6, wherein the aircraft engine is a gas turbine.

11. The method of claim 1, wherein the at least one noise-emitting area of the aircraft engine includes propeller blades.

* * * * *